(12) United States Patent
Parikh et al.

(10) Patent No.: US 9,703,710 B2
(45) Date of Patent: *Jul. 11, 2017

(54) MANAGING CACHE COHERENCE FOR MEMORY CACHES

(71) Applicant: International Business Machines Corporation, Armonk, NY (US)

(72) Inventors: Dharmesh Parikh, Bangalore (IN); Gopikrishnan Viswanadhan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 14/870,173

(22) Filed: Sep. 30, 2015

(65) Prior Publication Data
US 2017/0052893 A1    Feb. 23, 2017

Related U.S. Application Data

(63) Continuation of application No. 14/830,075, filed on Aug. 19, 2015.

(51) Int. Cl.
*G06F 12/0815*    (2016.01)

(52) U.S. Cl.
CPC .... *G06F 12/0815* (2013.01); *G06F 2212/621* (2013.01)

(58) Field of Classification Search
CPC .............. G06F 12/0815; G06F 12/084; G06F 12/0844; G06F 12/0831; G06F 2212/621; G06F 13/1652; G06F 13/1657
See application file for complete search history.

(56) References Cited

U.S. PATENT DOCUMENTS

| | | | |
|---|---|---|---|
| 6,209,053 B1 * | 3/2001 | Kurts ................. | G06F 13/4208 710/113 |
| 7,386,681 B2 | 6/2008 | Guthrie et al. | |
| 7,925,840 B2 | 4/2011 | Harris et al. | |
| 2006/0259707 A1 * | 11/2006 | Freytag ............... | G06F 12/0831 711/146 |

(Continued)

OTHER PUBLICATIONS

Parikh, et al., "Managing Cache Coherence for Memory Caches", U.S. Appl. No. 14/830,075, filed Aug. 19, 2015.

(Continued)

*Primary Examiner* — Jared Rutz
*Assistant Examiner* — Khoa D Doan
(74) *Attorney, Agent, or Firm* — Nicholas D. Bowman

(57) ABSTRACT

A computer system has a plurality of processors with non-blocking memory caches. A controller sets an upper limit of allowed snoop commands for the computer system. The controller adjusts, using real-time bandwidth data of the computing system, the limit of snoop commands to a new numerical value. The controller detects that the snoop limit is being adjusted between snoop rates more than a threshold number of times. The controller designates an overriding limit of snoop commands in response to detecting the snoop limit being adjusted more than the threshold number of times. The overriding limit of snoop commands is fixed for a period of time. The controller delays snoop commands which exceed the overriding limit of snoop commands during the period of time.

9 Claims, 6 Drawing Sheets

(56) References Cited

U.S. PATENT DOCUMENTS

| | | | |
|---|---|---|---|
| 2009/0158022 A1* | 6/2009 | Radhakrishnan ... | G06F 12/0817 713/2 |
| 2009/0193232 A1* | 7/2009 | Watanabe ........... | G06F 12/0831 712/205 |
| 2010/0057997 A1* | 3/2010 | Moyer ................ | G06F 12/0831 711/146 |
| 2010/0057998 A1* | 3/2010 | Moyer ................ | G06F 12/0831 711/146 |
| 2015/0052308 A1* | 2/2015 | Ray ........................ | G06F 9/528 711/125 |

OTHER PUBLICATIONS

List of IBM Patents or Patent Applications Treated as Related. Sep. 29, 2015. 2 pages.

* cited by examiner

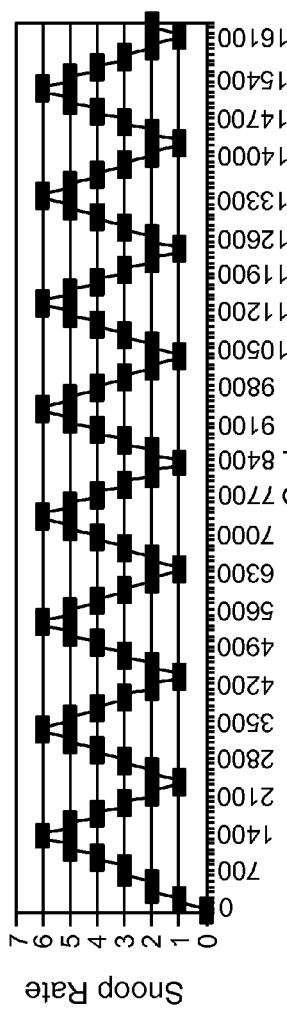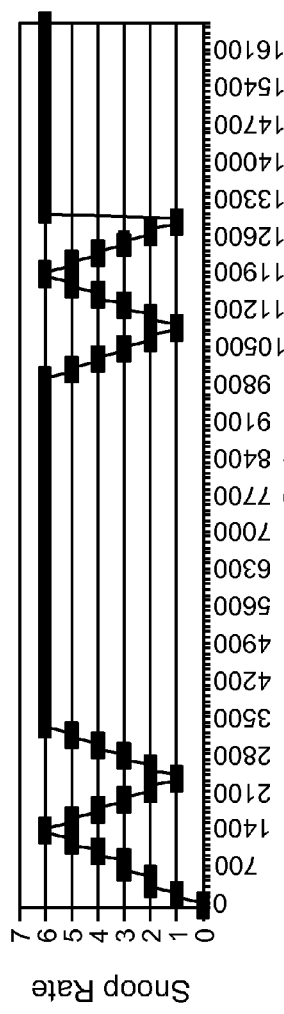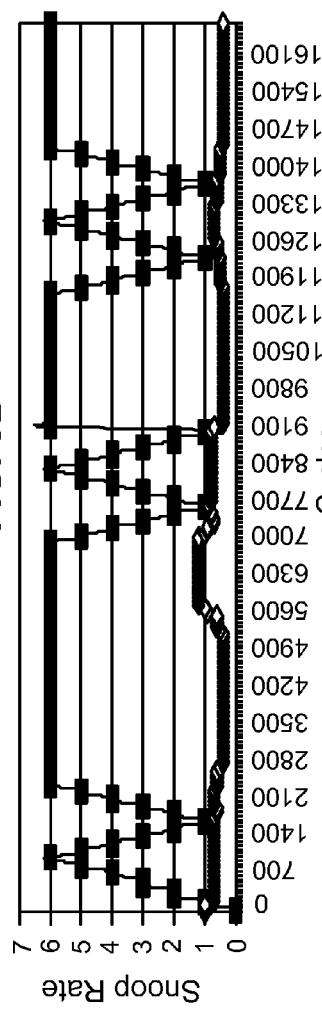

| Rate Level | 0 | 1 | 2 | 3 | 4 | 5 | 6 | 7 |
|---|---|---|---|---|---|---|---|---|
| Snoop Rate | 10 | 14 | 28 | 40 | 52 | 70 | 94 | 100 |

Snoop Rate Table

MANAGING CACHE COHERENCE FOR MEMORY CACHES

BACKGROUND

Memory systems of computing systems often involve bus sniffing, or bus snooping. Bus snooping is a technique used in distributed shared memory systems with computing systems which employ numerous processors. Bus snooping is used to assist in cache coherence for the processors, each of which may have at least one memory cache. By checking/snooping a central memory, individual processors may verify the continued accuracy of a localized cache.

SUMMARY

Embodiments of the disclosure provide a method, system, and computer program product for managing cache coherence for non-blocking memory caches in a computing system. The computing system may include a plurality of processors with non-blocking memory caches. The processors may include snoop controllers to manage the snoop commands for the memory caches. A snoop controller may set a limit of snoop commands for the non-blocking memory cache to a numerical value. The limit may be the highest amount of snoop commands which can be sent in the computing system in a given period of time. The snoop controller may adjust, using real-time bandwidth data of the computing system, the limit of snoop commands to a new numerical value. The snoop controller may detect that the snoop limit is being adjusted between snoop rate values more than a threshold number of times. The snoop controller may designate an overriding limit of snoop commands in response to detecting the snoop limit being adjusted more than the threshold number of times. The overriding limit of snoop commands may be fixed for a certain period of time. The snoop controller may then delay snoop commands which exceed the overriding limit of snoop commands during said period of time.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3A is an illustration of a snoop limit changing over time, according to embodiments.

FIG. 3B is an illustration of a snoop limit changing over time, leading to overriding snoop limits, according to embodiments.

FIG. 3C is an illustration of a snoop limit changing over time, leading to overriding snoop limits determined using cycles per instruction, according to embodiments.

Figure 1:
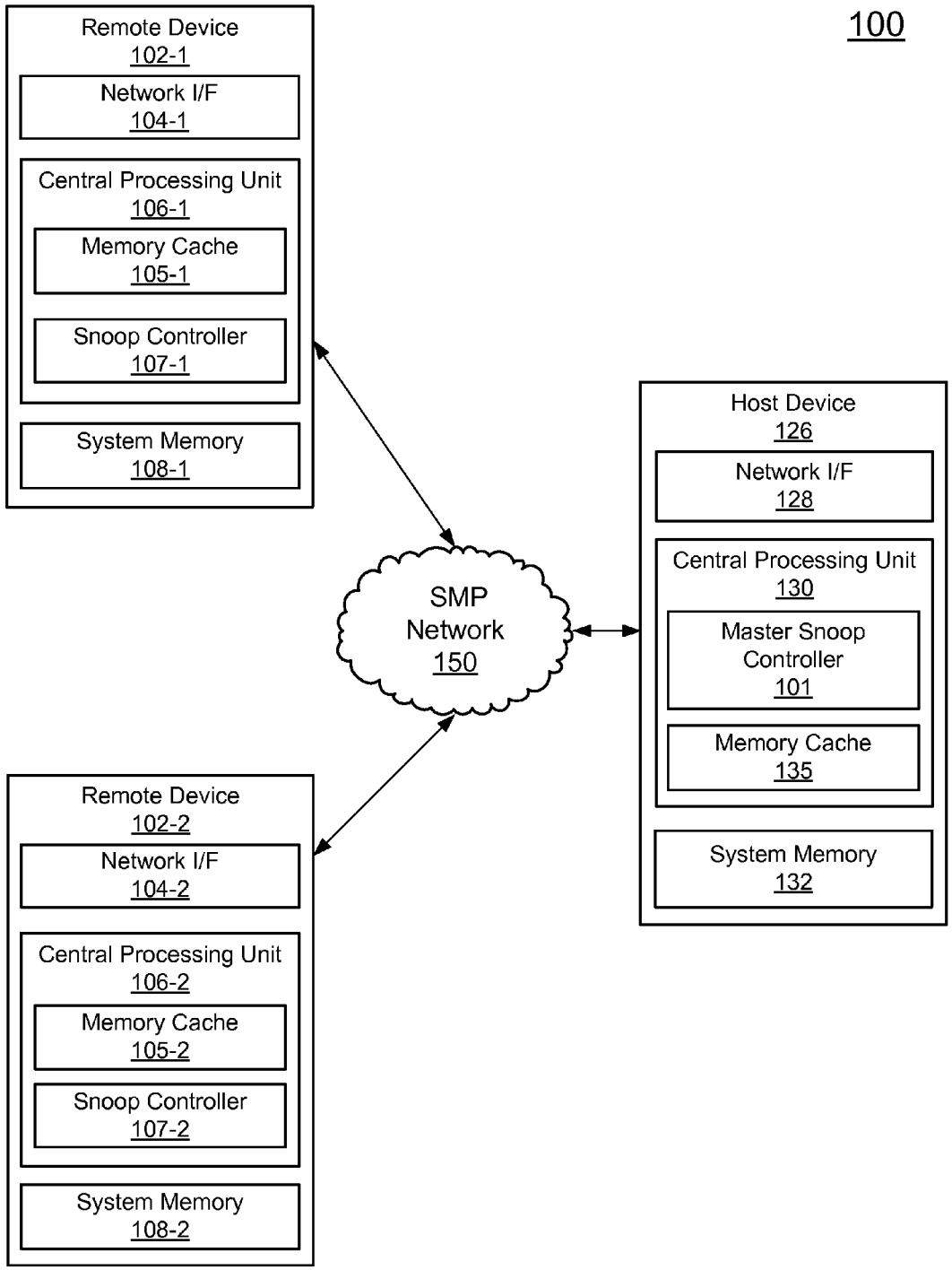
FIG. 1 is an illustration of homogeneous computing systems for managing cache coherence of a plurality of memory caches, according to embodiments.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to various embodiments of a system and method for managing cache coherence for a non-blocking memory cache in a computing system. In a multi-processor system with a non-blocking snoop coherence protocol, a controller may monitor the snoop rate. The snoop rate may change depending upon the retry responses detected by the controller in response to snoop commands sent by processor chip agents. The controller may detect when the snoop rate enters into an oscillation loop between two snoop rates which may continue until system resources change. To stop the loop the controller may lock the snoop rate to a single overriding snoop limit. While the present disclosure is not necessarily limited to such applications, various aspects of the disclosure may be appreciated through a discussion of various examples using this context. Examples and example values discussed herein are provided by way of example only and are not to be construed as limiting.

In instances, computing systems may include a plurality of processors. Such a multi-processor system may include a plurality of individual memory caches for processor nodes. The processor nodes may have agents which sniff or snoop other memory caches to verify the continued accuracy/coherency of memory caches. A snoop protocol may limit the rate at which snoop commands may be sent/broadcast in the multi-processor system by using a non-blocking protocol. The non-blocking snoop protocol may utilize two responses to a snoop command: a permission to execute the snoop command which would allow the snoop rate to stay within the current snoop limit or a retry response for a snoop command which would cause the snoop rate to exceed the current snoop limit. A retry response may result in the agent of the processor node which sent the excessive snoop command to re-issue the same snoop command at a later period in time.

In instances, the controller may automatically and dynamically change the snoop limit based on bandwidth usage to certain predetermined snoop rates. The controller may account for changes in bandwidth usage by determining the amount of retry responses in a given time period. In some instances, the system may have excess bandwidth at a slower limit and insufficient bandwidth at a faster limit, and automatic adjustments by the system may result in modulation between a plurality of predetermined snoop rates. Such rapid adjustments may continue until the resources/bandwidth of the system change, and may lead to performance degradation.

Aspects of the disclosure are directed towards managing cache coherence to avoid such performance degradation. After a limit of snoop commands is set in a system which can dynamically adjust the snoop limit based on system bandwidth, the system will monitor how the limit is adjusted. The system can identify that the snoop rate limit is in a loop modulating between two or more snoop rates. Once identified, the dynamic adjustment may be overridden, capping the system at a single snoop rate. The system may hold the snoop limit at the lower of the two modulating snoop rates. In this way the system may limit bandwidth consumption of interconnect between processor chips when the system is stuck in such an "infinite loop." The system may also avoid the increased latency of command execution due to excessive retries at the higher limit. In some embodiments, the snoop limit may be held to a limit for a configurable period of time. The period of time may be configurable by a user. The period of time may also be tied to the cycles per instruction (CPI) of the system. In some embodiments, the system may only use CPI when the snoop protocol has just been released from an overriding limit only to immediately reenter a second endless loop.

The snoop controller may set the snoop limit to a snoop rate from a snoop lookup table with a plurality of predetermined snoop rates. When a snoop rate is not fast or slow enough, the controller may determine a new snoop rate from the snoop lookup table which is more appropriate for the current system bandwidth. In some embodiments, there may be greater incremental gaps between some neighboring snoop rates in the look-up table than others for various reasons. When the delta between the current snoop rate and a subsequent snoop rate of the look-up table is greater than a threshold (e.g., when a system is switching between two rates of the look-up table with a larger-than-average difference), a controller may determine to set the snoop limit to a snoop rate between the current snoop rate and the subsequent snoop rate. By dynamically setting the snoop limit to a snoop rate not pre-programmed into the controller protocol, the controller may maximize the efficiency of resource usage of the system during snooping.

Turning now to the figures, FIG. 1 is a diagrammatic illustration of an example computer system 100, consistent with embodiments of the present disclosure. In certain embodiments, the computer system 100 can include one or more remote devices 102 and one or more host devices 126. The host device 126 and remote devices 102 may be part of a homogeneous single image system on a symmetric multiprocessing (SMP) network. As such, the host device and remote devices may be part of a multi-processor parallel processing switch-based system. Nodes across the system may have a global view with which the coherency state is maintained. Given the homogenous single image nature of the system, similar performance across the host and remote devices can be assumed, providing performance and scalability advantages.

In some embodiments each processor may have a snoop controller which manages snoop commands for a memory cache of the processor. The host device may have a master snoop controller 101, which both manages snoop commands for the memory cache 135 of the host device and sets thresholds, adjusts limits, and determines limits as described herein. The remote devices may have snoop controllers 107-1, 107-2 within their central processing units 106-1, 106-2 which manage snoop commands for the central processing units (CPUs) 106 memory caches 105-1, 105-2. The snoop controllers 101, 107 may work to maintain to a coherency state across the SMP network. Although two remote devices 102-1, 102-2 are shown in FIG. 1 for purposes of illustration, it is to be understood that more than two remote devices can be included in other embodiments. Remote devices 102 and host device 126 may have separate locations and communicate over the SMP network 150. In the SMP network 150, the host device 126 may comprise a central hub from which remote devices 102 can establish a communication connection.

In certain embodiments the SMP network 150 can be implemented using any number of any suitable communications topologies (e.g., wide area network (WAN), local area network (LAN), Internet, Intranet, hardwire, wireless link, etc.). Snoop commands may be transmitted between host 126 and remote device 102 over the SMP network 150. In certain embodiments, the SMP network 150 can be implemented within a cloud computer system, or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers.

Consistent with various embodiments, the host device 126 and remote devices 102 may be implemented as a computer system including a respective set of system components. In certain embodiments, one or more of host device 126 and remote devices 102 may be equipped with a respective display or monitor. In certain embodiments, each computer system may include at least one respective central processing unit 106, 130; respective system memories 108, 132; respective internal or external network interface or communications devices 104, 128 (e.g., modem, network cards, etc.); and/or respective optional input devices (e.g., a keyboard, mouse, or other input device), as well as commercially available and custom software (e.g., browser software, communications software, server software, natural language processing software, search engine and/or web crawling software, filter modules for filtering content based upon predefined criteria, etc.). In certain embodiments, the user may input data relating to the duration of overriding snoop limits or the specific values of some thresholds through one or more of these system components. Other system components and configurations of host device 126 and remote devices 102 are also possible.

In certain embodiments, each of the computer systems may be implemented as one of a server, desktop, laptop, or hand-held devices. In addition, the snoop controllers 101, 107 may include one or more modules to perform the various functions of embodiments described herein.

Figure 2:
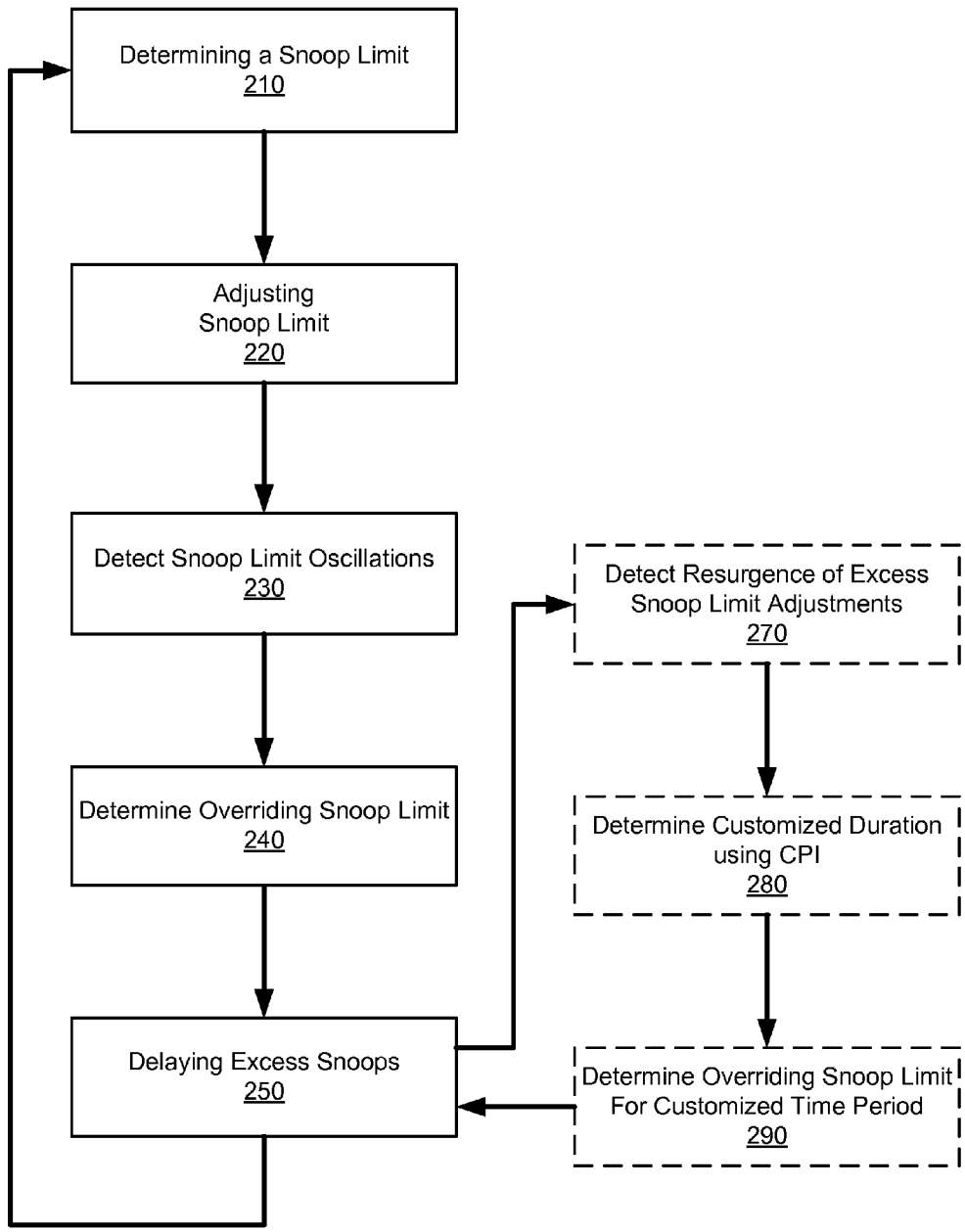
FIG. 2 is a method for managing cache coherence in a computing system with a plurality of memory caches, according to embodiments.

FIG. 2 is a flowchart illustrating a method 200 for managing cache coherence for a computing system. The computing system may include a plurality of processors. For example, the computing system may comprise a SMP system. One or more processors of the SMP computing system may have individual memory caches. The processors may use agents (e.g., snoop controllers) to snoop the state of other memory caches through the computing system to fetch data, supply data, or otherwise maintain a coherency state. The computing system may employ a snoop protocol to manage snooping, where a snoop controller (hereinafter interchangeably referred to as a controller and snoop controller) changes snoop protocol according to the method 200. The visual arrangement of blocks in the flowchart of FIG. 2 is not to be construed as limiting the order in which the individual acts/operations may be performed, as certain embodiments may perform the operations of FIG. 2 in alternative orders. Blocks which are depicted with dashed lines are to be construed as optional operations.

At block 210 a snoop limit is set for the computing system. The snoop limit may be set by the snoop controller. In some embodiments, the snoop limit may be the maximum rate at which snoop commands can be sent in the computing system. Snoop commands may be commands from a processor which identify the state of data in a memory cache which is not used by the processor. The processor may then compare the state of this data to the state of data of a memory cache used by the processor to keep the coherency state (e.g., a state where numerous parallel instances of the same dataset maintain consistent values). The computing system may have a snoop limit to ensure that processor bandwidth does not exceed a limit allotted to verifying the coherency state.

Figures 4A, 4B:
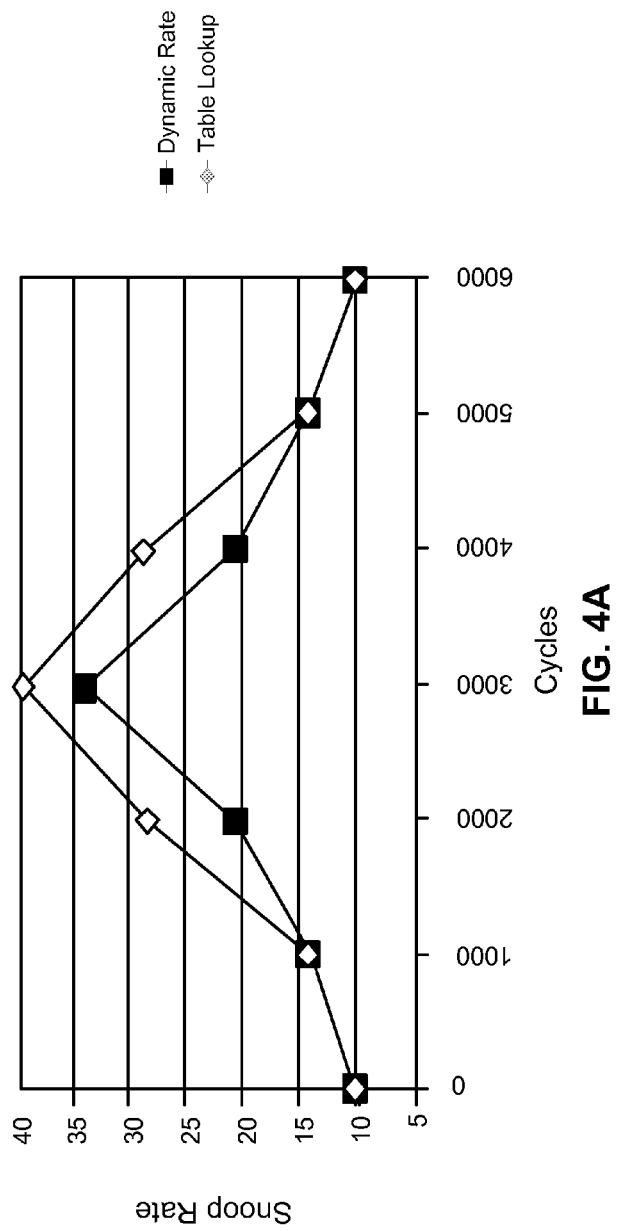
FIG. 4A is an illustration of a snoop limit changing according to a snoop rate lookup table and a dynamic rate computation, according to embodiments.
FIG. 4B is an illustration of a snoop rate lookup table, according to embodiments.

In some embodiments, the snoop limit is one of a predetermined set of snoop rates. A snoop rate may be a metric of how many snoop commands are being sent over an SMP system, while a snoop limit may be a restriction upon how many snoop commands may be sent in a given period. When the snoop controller has occasion to set/adjust the snoop rate, the snoop controller may reference a snoop rate lookup table which includes such predetermined snoop rates. An example of a snoop lookup table is shown in FIG. 4B. For example, a snoop controller may start by setting the snoop limit to the fastest snoop rate of a lookup table, which may be a rate where a processor sends one snoop every 10 cycles. Other embodiments may set rates and limits as snoops per unit of time.

Processor snoop caches may use "non-blocking" snoop protocols for memory caches. Non-blocking snoop protocol allows for snoop commands over the snoop limit to result in a retry response. A retry response allows the processor responsible for sending the original snoop command (e.g., the snoop command which was over the snoop limit) to re-issue the same snoop command at a later point in time. These embodiments may have the advantage of providing more scalable computing systems.

At block 220 the snoop limit is adjusted. The snoop controller may adjust the snoop limit. In some embodiments, snoop limit may be adjusted using an existing coherence-retry protocol, such as IBM POWER coherency protocol. In certain embodiments, IBM POWER coherency protocol may also include the operation of block 210. The snoop limit may be adjusted in reaction to real-time capacity information of the computing system. In some embodiments, the real-time capacity information may be the number of retry responses detected by the snoop controller. If the number of retries within a time window is greater than a threshold level (e.g., 50 retry responses within a certain period), then the snoop rate may be lowered. At the same time, if the number of retry responses within a time window is lower than a threshold level (e.g., 30 retry responses within the same period), then the snoop rate may be increased. In certain embodiments, these thresholds may be configurable by a user. In a separate embodiment, these thresholds may be predetermined and stored in metadata of a snoop rate lookup table. The increase or decrease of the snoop rate/bandwidth may be called a rate change event.

In some embodiments, the snoop controller may adjust the snoop limit snoop rates which are more than a single "level" away. For example, if a snoop rate lookup table has eight snoop rates, the snoop controller may adjust the snoop limit from snoop rate the fastest rate (e.g., one snoop every 10 cycles) straight to the slowest rate (e.g., one snoop every 100 cycles). The snoop controller may determine which snoop rate to adjust to using metadata of the snoop rate lookup data which links snoop rates to system bandwidth data (e.g., specific amounts of retry responses). For example, if a computing system is at a snoop rate of one snoop every 10 cycles and detects a certain number retry responses which is higher than a predetermined threshold, the snoop controller may check metadata of the snoop rate lookup table and see that X retry responses corresponds with a snoop rate which is three levels slower. In some embodiments, a system user may be able to alter the predetermined threshold. In certain embodiments, the snoop controller may stay at the lower snoop rate for a prolonged period of time, adjusting the snoop limit to various snoop rates in response to changes in the bandwidth of the computing system.

Figure 6:
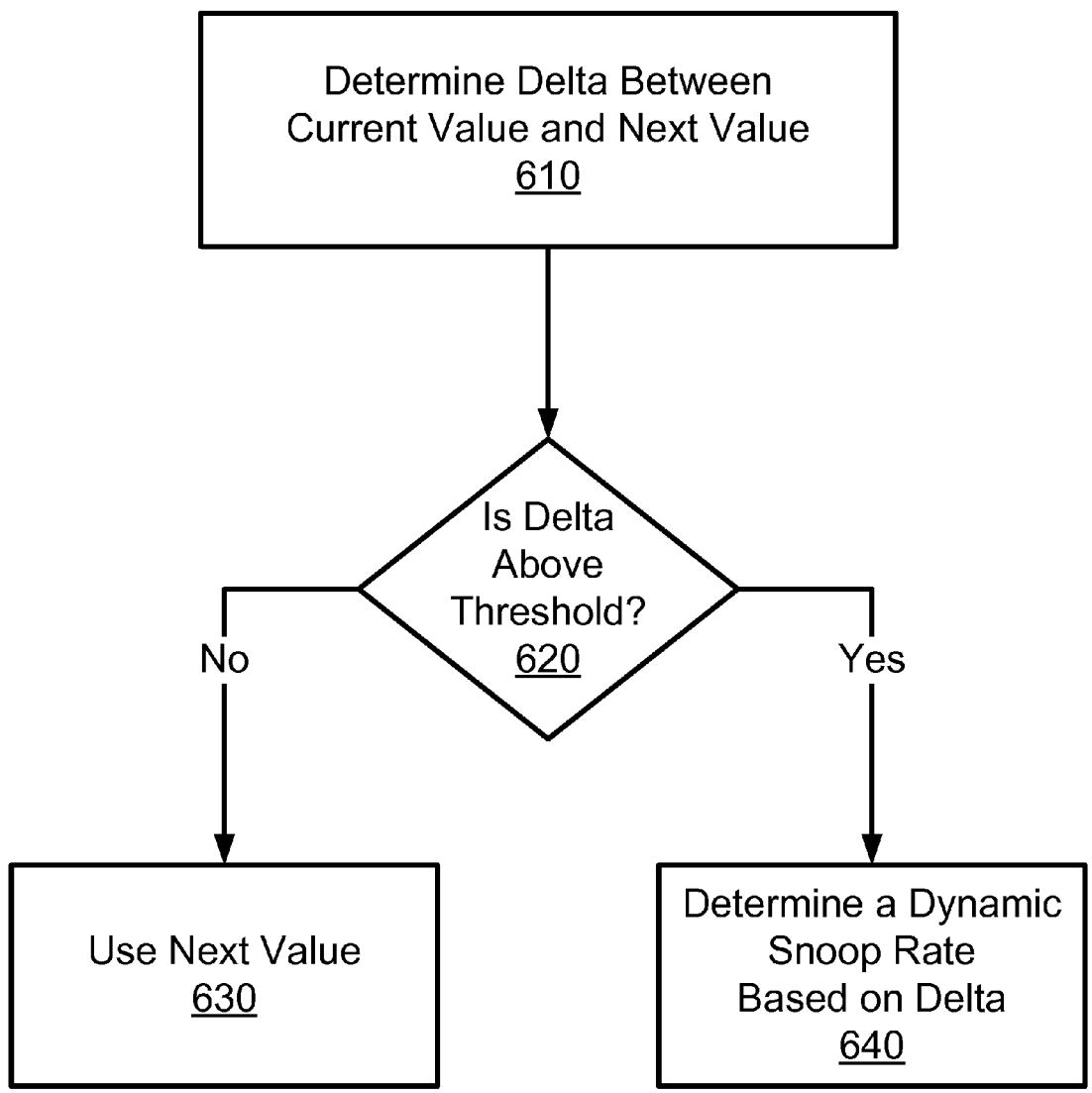
FIG. 6 is a method for dynamically determining a snoop rate, according to embodiments.

An alternate means of determining/adjusting a snoop limit is shown in FIG. 6. As shown in the method 600 of FIG. 6, a dynamic rate may be used to set snoop limits, in contrast to the snoop controller exclusively utilizing predetermined snoop rates (e.g., rates from a lookup table). A dynamic rate may be a rate which was not predetermined but instead identified and selected by the snoop controller in response to ongoing system bandwidth. At block 610 within FIG. 6, the snoop controller may determine the delta between the current snoop rate and the next faster/slower snoop rate, depending upon whether or not the snoop rate is trending up or down (e.g., whether or not the retry responses are high or low). In certain embodiments, a snoop controller may only use a dynamic snoop rate rather than a predetermined snoop rate when the snoop limit would otherwise be adjusted to the next fastest/slowest predetermined snoop rate. For example, if the snoop controller determined that the retry responses dictated that the system slow from the second fastest to the second slowest snoop rate (e.g., a jump of five snoop rates), predetermined snoop rates could be used rather than dynamic snoop rates. In this way, dynamic snoop rates may be used to fine tune snoop rate usage.

For an example of the snoop controller finding a delta, suppose a processor node has a current snoop limit of the fastest snoop rate of the lookup table (e.g., one snoop command allowed per 10 cycles). As the retry responses increase and the snoop controller looks to move to the next slowest snoop rate (e.g., one snoop command allowed per 14 cycles), the snoop controller may determine that the delta is 4 cycles. After a further retry response increase, the controller may determine to adjust once more to a slower rate (e.g., one snoop allowed per 28 cycles), and may therein determine that the next delta is 14 cycles.

At block 620, the snoop controller may evaluate whether the delta is within a specific threshold. If the delta is within a threshold (e.g., the delta and accompanying rate jump is small), at block 630 the snoop controller may use a snoop lookup table to determine snoop limit, therein designating and enforcing predetermined snoop rates. If the delta meets/exceeds the threshold (e.g., the delta and accompany rate jump is relatively large), at block 640 the snoop controller may determine a value between the current value and the next value. To continue the example above, the threshold may be 6 cycles. This threshold may be itself predetermined and/or customizable by a user. In the first rate change event, 4 cycles is less than 6 cycles, so the threshold is not met. As such, the snoop controller would change the snoop limit to a predetermined snoop rate (e.g., a snoop command ever 14 cycles). However, for the second example, the difference of 14 cycles satisfies the threshold of 6 cycles. As a result, the snoop controller may determine a new snoop rate between the current snoop rate (e.g., a snoop every 14 cycles) and the next slowest snoop rate (e.g., a snoop ever 28 cycles), and may adjust the snoop limit to this new snoop rate.

Looking back to FIG. 2, operations within block 220 may be described as the typical operating procedure of the computing system. In some embodiments, operations within block 220 may be described as the normal over-subscription mode. When in this normal over-subscription mode, the snoop controller may use method 600 to dynamically determine snoop rates. The method 200 may move to block 230 to handle events which are outside of this typical operating procedure/over-subscription mode.

At block 230 snoop limit oscillations are detected. The snoop controller may detect the oscillations, hereinafter referred to as a hysteresis event. The snoop limit may undergo a hysteresis event when the snoop rates are not well-synchronized with the current resources/performance/activity level across the processors of the SMP system. For example, at a faster snoop rate, the snoop controller may detect a large amount of retry responses, and may adjust the snoop limit to a slower sloop rate. At the slower snoop rate, the response retries may drop dramatically, signaling a possibility for a higher snoop rate, in response to which the snoop controller may increase the snoop limit back up to the higher snoop rate. The snoop controller may repeat adjusting the snoop limit between two such snoop rates until the current resources/performance/activity level of the computing system match a snoop rate, leading to oscillation between two snoop rates. In certain embodiments, a hysteresis event may include oscillations between more than two snoop rates.

The snoop controller may detect a hysteresis event when the snoop limit is adjusted more than a certain number of times (e.g., threshold number of times) between two snoop rates. In some embodiments, the snoop controller detecting a hysteresis event may also include a time element (e.g., the duration during which the certain number of adjustments take place or the duration at which the snoop controller holds a first snoop limit before oscillating back to a second snoop element). In some embodiments, the certain number of times and/or the time element may both be stable parameters, whether predetermined or configurable by a user. For example, the certain amount of times could be 5 times and the time element may be oscillation duration of 6000 cycles. In this example, if a snoop limit was adjusted 6 times within any 6000 cycle period, the snoop controller may determine the SMP system is undergoing a hysteresis event. Alternatively, the certain amount of times could be 3 times, and the duration of holding a certain snoop limit could be 100 cycles. In this example, if a snoop limit was adjusted 4 times while each of the 4 determined snoop limits was held for only 75 cycles, the controller may determine the SMP system is undergoing a hysteresis event. In this example, it may not matter how long it takes to complete the four oscillations, as long as each given level was not held for 100 cycles or longer.

In other embodiments, the certain number of times and/or the time element may be altered by the snoop controller in response to changing system performance. The number/amount of times may be altered from basepoints. For example, a basepoint number of adjustments is 5 adjustments while the basepoint amount of time is 6000 cycles (e.g., clock ticks of a main computing system clock). In this example, in response to degradation of computing system performance, the snoop limit may change the threshold to 3 adjustments within 3000 cycles to avoid one source of resource drain. As such, the snoop controller may determine that the SMP system is undergoing a hysteresis event when the snoop limit is adjusted 4 times within a 3000 cycles time period.

At block 240 an overriding snoop limit is determined. The overriding snoop limit (e.g., first overriding limit) may be a snoop limit which the snoop controller will hold steady (e.g., will not change) for a certain period of time (e.g., first period of time). The overriding snoop limit may be the slower of the snoop rates which the snoop limit was oscillating between. For example, if the snoop limit was oscillating between snoop rates of one snoop every 28 cycles and one snoop every 52 cycles, the overriding snoop limit may be one snoop every 52 cycles, as this is the slower of the two snoop limits.

In some embodiments, the duration (e.g., first period of time) of the overriding snoop limit is a steady parameter, whether predetermined or otherwise set/configurable by a user. For example, for a second hysteresis event the snoop controller may set an overriding snoop limit of 8000 clock ticks. In some embodiments, the snoop controller may use the same duration for all hysteresis events of a computing system. In other embodiments, different hysteresis events corresponding to different nodes/processors/memory caches may have different durations for the overriding snoop limit. The time period during which the overriding snoop limit is active may be referred to as the hysteresis mode interval.

At block 250 snoop commands which are over the overriding snoop limit are delayed. The snoop commands may be delayed using a retry response consistent with non-blocking snoop protocols. The snoop controller may use this non-blocking snoop protocol to delay snoops over the overriding snoop limit until the conclusion of the first period of time determined in block 240. For example, a snoop controller may detect at block 230 that a snoop limit has been changed three times within 2000 cycles between a snoop every 28 cycles and a snoop every 40 cycles, which meets the thresholds for a hysteresis event. In response to identifying the hysteresis event, the snoop controller may determine at block 240 an overriding snoop limit of a snoop command every 40 cycles, which is the slower of the two snoop rates which lead to the hysteresis event. The hysteresis mode interval may last for 10,000 cycles. At block 250, the snoop controller may send retry responses (e.g., may delay) for snoop commands which exceed the overriding snoop limit during these 10,000 cycles. In certain embodiments, retry responses may be sent using methods consistent with existing coherence-retry protocol, such as found in IBM POWER coherency protocol.

Upon the conclusion of the hysteresis mode interval the method 200 may include returning to block 210. For example, after determining an overriding snoop rate of a snoop command every 40 cycles at block 240, the snoop controller may hold this snoop limit steady for 10,000 cycles at 250, and after 10,000 cycles the snoop controller may set a new snoop rate using the retry responses at block 210. The method may then continue normal over-subscription mode at block 220.

At the conclusion of block 250 the snoop controller may detect that the system is undergoing a second hysteresis event, resulting in back-to-back hysteresis events without a substantive amount of time spent in normal over-subscription mode. In response to detecting this second hysteresis event, the method 200 may utilize a sub-routine (e.g., blocks 270, 280, and 290) before returning to block 210. The sub-routine may determine a new duration of a new overriding snoop limit. Following this determination within the sub-routine, the snoop controller may delay excess snoop commands at block 250 as described herein, following which—granted that there is not a third hysteresis event following the second hysteresis event—the method 200 would return back to block 210.

The sub-routine may begin at block 270. At block 270 the snoop controller may detect another hysteresis event within a threshold period of time of the conclusion of the previous hysteresis event. The threshold may be a predetermined amount of time. In some embodiments, the threshold may be a user-defined and configurable parameter. The threshold may be relatively quick and may signal that the computing system has not yet moved on from the situation which led to the first hysteresis event. In response to detecting a second hysteresis event within the threshold period of time (e.g., second time threshold), the computing system may determine how the cycles per instruction (CPI) of the system changed during the first hysteresis event. Specifically, the snoop controller may determine how CPI changed from the inception of the first hysteresis event to the conclusion of the hysteresis event. Higher CPI may indicate performance loss. If the CPI at the conclusion of the first hysteresis mode interval is equal to or lower than the CPI at the inception of it, then the controller may reduce the increase of the hysteresis mode interval relative to the duration of the first hysteresis event. Conversely, if the CPI at the conclusion of the hysteresis event is higher than the CPI at the inception of the hysteresis event, then the snoop controller may reduce the duration of the hysteresis mode interval. Once a customized determination is made by the snoop controller, the snoop controller may determine the overriding snoop rate for the second hysteresis event as described herein at block 290. Once the overriding snoop limit (e.g., second overriding limit of snoop commands) is determined, the system may proceed to block 250 where the snoop controller may use retry responses to delay excess snoop commands for the duration determined in block 280.

FIG. 3A is an illustration of a hysteresis event, according to embodiments. The snoop limit is seen here oscillating between snoop rate 1 and snoop rate 6, making an oscillation between the two once approximately every 1000 cycles. Depending upon the resources/activity of the computing system, the hysteresis event may include two such disparate snoop limits, rather than two snoop limits which are proximate snoop rates (e.g., switching between snoop rate 7 and snoop rate 6). As shown in FIG. 3A, the snoop rate may continue oscillating between the two rates in a loop until the available system resources or current system activity change.

FIG. 3B is an illustration of a hysteresis event leading to overriding snoop limits, according to embodiments. The snoop rate begins oscillating between snoop rate 1 and 6, switching between the two rates twice and attempting to switch again within approximately 1900 cycles. The threshold may be two oscillations within 2000 cycles, making the three attempted oscillations more than the threshold amount of adjustments while 1900 cycles is within the threshold amount of time. In response to the snoop limit satisfying these thresholds, the snoop controller may designate a new overriding snoop limit of the slower of the two snoop rates of the hysteresis event, which here is snoop rate 6.

At this point the snoop controller uses non-blocking snoop protocol to hold the snoop limit at snoop rate 6 for the hysteresis mode interval of approximately 7000 cycles. When the hysteresis mode interval expires at around 9800 cycles in FIG. 3B, the snoop controller may set the snoop limit according to the number of retry responses as described herein. If the resources system activity has not changed, the computing system may enter the same loop between snoop rate 1 and 6 for a new hysteresis event. After again meeting a threshold for attempting to switch three times within 2000 cycles, the snoop controller may again set an overriding snoop limit on the computing system. The overriding snoop limit may be at the same snoop rate (snoop rate 6) and for the same duration (7000 cycles) as the overriding snoop limit previously used.

In certain embodiments, the threshold to use an overriding snoop limit may be different immediately after the use of an overriding snoop limit. For example, during normal oversubscription mode, the thresholds of a hysteresis event may be three rate changes within 2000 cycles. However, due to the possibility of a reoccurrence of a second hysteresis event, the thresholds may be lower immediately following the conclusion of the hysteresis mode interval, allowing two rate changes within 2000 cycles to constitute a hysteresis event. In some embodiments, the overriding snoop limit may be for a different snoop rate or duration in a proceeding snoop adjustment event. For example, in expecting that each successive hysteresis event may be more likely to have reached the end of the system bandwidth/activity which created the hysteresis event, each successive hysteresis mode interval may be 10% shorter than the interval which immediately preceded it in a back-to-back hysteresis event.

FIG. 3C is an illustration of a snoop limit changing over time and leading to a snoop controller determining hysteresis mode intervals using cycles per instruction. FIG. 3C may start as FIG. 3B started, in that a hysteresis event may meet a threshold and trigger the use of an overriding snoop limit. In FIG. 3C the initial overriding snoop limit is held for a duration of 5000 cycles before it concludes. However, in FIG. 3C, when a snoop controller detects a second hysteresis event within a time threshold (e.g., second time threshold) of the conclusion of the first hysteresis event, the snoop controller may dynamically adjusts the duration of the next overriding snoop limit (e.g., second overriding limit of snoop commands).

Specifically, the snoop controller may determine the cycles per instruction (CPI) of the system at the inception and the conclusion of a hysteresis mode interval. Higher CPI may indicate performance loss. The snoop controller may (at least temporarily) store the CPI at the inception and conclusion of the first overriding snoop limit. If another hysteresis event is triggered within a threshold of this conclusion, the snoop controller may compare the CPI at the conclusion of the first hysteresis mode interval to the CPI at the inception of the first hysteresis mode interval. If the CPI at the conclusion of the first hysteresis mode interval is higher than to the CPI at the inception of it, then the snoop controller may reduce the duration of the new hysteresis mode interval relative to the previous hysteresis mode interval. Conversely, if the CPI at the conclusion of the hysteresis mode interval is equal to or lower than the CPI at the inception of the hysteresis mode interval, then the snoop controller may increase the duration of the second hysteresis mode interval. In this way the snoop controller may dynamically determine the length of hysteresis mode intervals to increase the likelihood that the conclusion of the hysteresis mode interval will surpass the system bandwidth/activity which lead to the hysteresis event.

FIG. 4A is an illustration of a snoop limit changing according to a snoop rate table lookup and a dynamic rate computation, according to embodiments. The diamonds convey changing a snoop rate according to a snoop rate table lookup as shown in FIG. 4B. As time progresses, the snoop controller gradually slows the snoop limit from snoop rate 0 (1 snoop per 10 cycles), to snoop rate 1 (1 snoop per 14 cycles), to snoop rate 2 (1 snoop per 28 cycles), to snoop rate 3 (1 snoop per 40 cycles), and then speeds the snoop rate up with the opposite progression.

However, there may be times when the fixed values of the snoop rate table may skip a snoop value which would better service the computing system. To identify such a value, the snoop controller may set the snoop limit to a snoop rate between the fixed values of the snoop rate table. The snoop controller may do this if the difference/delta between the current snoop rate and the next faster/slower snoop rate level in the table satisfies a threshold.

For example, the threshold delta may be 6 cycles, and the current snoop rate may be snoop rate 0. As the retry responses increase and the snoop controller looks to move from snoop rate 0 to 1, the snoop controller may determine that the delta of 4 cycles does not satisfy the threshold of 6 cycles, and may therefore change the snoop rate to snoop rate 1.

During the next snoop rate change, the snoop controller may determine that the next delta of 14 satisfies the threshold, and may therefore determine a dynamic rate between rate 1 and rate 2. In this embodiment, the controller determines a dynamic rate half way between rate 1 and rate 2, which would allow a snoop every 21 cycles. In other embodiments, the dynamic rate may calculate a dynamic rate as closer to the current/faster/slower snoop rate depending upon the number of retry responses. For example, if the current snoop rate is resulting in an amount of retry responses which barely meets the threshold, the snoop controller may determine to stay closer to the current rate rather than setting a snoop rate half way between the next faster/slower snoop rate. On the other hand, if the amount of retry responses easily satisfies the threshold, the snoop controller may determine to move to a snoop rate closer to the next fastest/slowest, perhaps setting a snoop rate 75% of the way towards the next rate.

When the number of retries again merits another snoop rate change, the snoop controller may determine that the delta between rates 3 and 4 (12 cycles) satisfies the threshold. Therein, the snoop controller may again determine a new snoop rate between the two table lookup rates. This new snoop rate may again be half way between the two snoop rates, in this case a snoop every 34 cycles. In other embodiments, when the amount of retries again merits another snoop rate change, the snoop controller may determine if the delta between the current snoop rate (e.g., a snoop every 21 cycles) and the next rate level in the table (e.g., rate 3, or a snoop every 28 cycles) is greater than the threshold. In this case, a delta of 7 would satisfy the threshold of 6, resulting in the snoop controller creating a new dynamic snoop rate between the current rate and rate 3. In this way a snoop controller may dynamically determine new snoop rates which were not originally on the fixed lookup table. In some embodiments the snoop controller may thus determine such new snoop rates without setting overriding limits.

FIG. 4B is an illustration of a snoop rate table, according to embodiments. The embodiment in FIG. 4B has eight snoop rates; embodiments with more and less snoop rates are also possible. The values of the different snoop rates in the snoop rate table of FIG. 4B are for illustration only, many more values are possible, whether higher and lower. Snoop rate tables may also show snoop rates in units other than snoops per cycles. For example, certain embodiments may capture snoops per second. The snoop rate lookup table may also include metadata on a number of retry responses which is associated with a given snoop rate. For example, a snoop controller may detect a certain number of retry responses at one snoop limit and, referencing this information against metadata of the snoop rate lookup table, identify a new snoop rate from the lookup table to use as a snoop limit.

Figure 5:
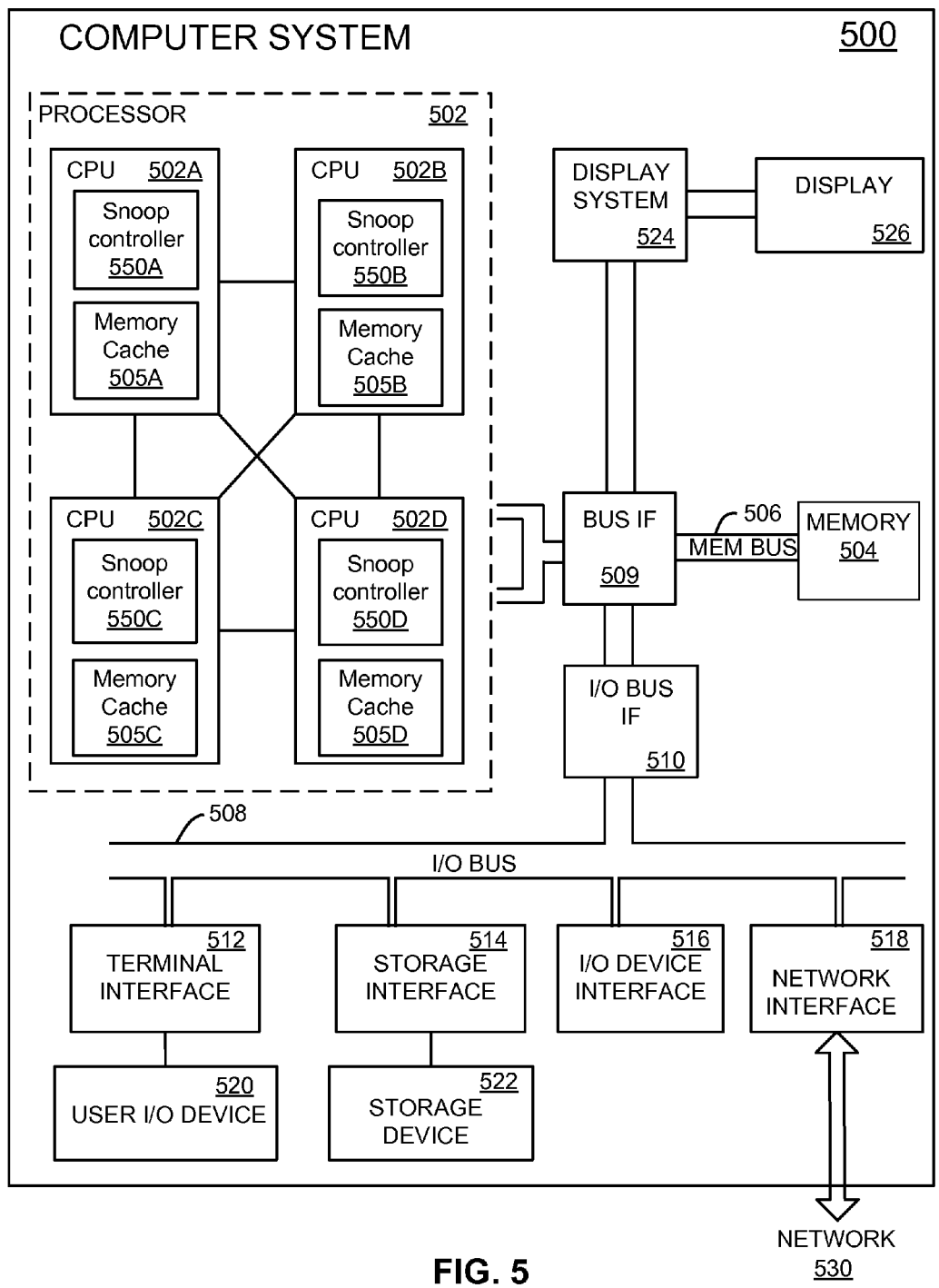
FIG. 5 is an apparatus for managing cache coherence for a plurality of memory caches, according to embodiments.

FIG. 5 depicts a high-level block diagram of a computer system 500 for which can be used to implement the host device or user device discussed above in FIG. 1. The components of the various embodiments disclosed herein apply equally to any appropriate computing system. The components of the example computer system 500 shown in FIG. 5 include one or more processors 502, a memory 504, a terminal interface 512, an I/O (Input/Output) device interface 516, and a network interface 518, all of which are communicatively coupled, directly or indirectly, for inter-component communication via a memory bus 506, an I/O bus 508, bus interface unit 509, and an I/O bus interface unit 510.

The computer system 500 may contain a plurality of general-purpose programmable CPUs 502A, 502B, 502C, and 502D, herein generically referred to as the processor 502 or processors 502. The processors 502 may be arranged as shown in a SMP multiprocessor system, connected by SMP links for data and coherency traffic. Each CPU may have a memory cache 505A, 505B, 505C, 505D to store copies of data, such as data which is otherwise stored in the main memory 504. By maintaining individual memory caches 505 which are smaller and faster than the main memory 504, the CPUs 502 may reduce the time needed to access data. To maintain a coherency state of the memory caches 505, the CPUs 502 may include snoop controllers 550A, 550B, 550C, and 550D, herein generically referred to as the snoop controller 550. Each processor 502 executes instructions such as the instructions from the snoop controller 550 to perform the acts described with respect to method 200.

In some embodiments, the memory 504 may include a random-access semiconductor memory, storage device, or storage medium (either volatile or non-volatile) for storing or encoding data and programs. The memory 504 can include stored or historical data such as CPI or the lookup table as described herein. In certain embodiments, the memory 504 represents the entire virtual memory of the computer system 500, and may also include the virtual memory of other computer systems coupled to the computer system 500 or connected via a network. The memory 504 can be conceptually viewed as a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In this example, the computer system 500 includes a bus interface unit 509 to handle communications among the processor 502, the memory 504, a display system 524, and the I/O bus interface unit 510. The I/O bus interface unit 510 may be coupled with the I/O bus 508 for transferring data to and from the various I/O units. The I/O bus interface unit 510 communicates with multiple I/O interface units 512, 516, and 518, which are also known as I/O processors (IOPs) or I/O adapters (IOAs), through the I/O bus 508. The display system 524 may include a display controller, a display memory, or both. The display controller may provide video, audio, or both types of data to a display device 526. The display memory may be a dedicated memory for buffering video data. The display system 524 may be coupled with a display device 526, such as a standalone display screen, computer monitor, television, or a tablet or handheld device display. In one embodiment, the display device 526 may include one or more speakers for rendering audio. Alternatively, one or more speakers for rendering audio may be coupled with an I/O interface unit. In alternate embodiments, one or more of the functions provided by the display system 524 may be on board an integrated circuit that also includes the processor 502. In addition, one or more of the functions provided by the bus interface unit 509 may be on board an integrated circuit that also includes the processor 502.

The I/O interface units support communication with a variety of storage and I/O devices. For example, the terminal interface unit 512 supports the attachment of one or more user I/O devices 520, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 520 and the computer system 500, and may receive output data via the user output devices. For example, a user interface may be presented via the user I/O device 520, such as displayed on a display device, played via a speaker, or printed via a printer.

The I/O device interface 516 provides an interface to any of various other I/O devices or devices of other types, such as printers or fax machines. The network interface 518 provides one or more communication paths from the computer system 500 to other digital devices and computer systems; these communication paths may include, e.g., one or more networks 520.

Although the computer system 500 shown in FIG. 5 illustrates a particular bus structure providing a direct communication path among the processors 502, the memory 504, the bus interface 509, the display system 524, and the I/O bus interface unit 510, in alternative embodiments the computer system 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 510 and the I/O bus 508 are shown as single respective units, the computer system 500 may, in fact, contain multiple I/O bus interface units 510 and/or multiple I/O buses 508. While multiple I/O interface units are shown, which separate the I/O bus 508 from various communications paths running to the various I/O devices, in other embodiments, some or all of the I/O devices are connected directly to one or more system I/O buses.

FIG. 5 depicts several example components of the computer system 500. Individual components, however, may have greater complexity than represented in FIG. 5, components other than or in addition to those shown in FIG. 5 may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different manners, including using various computer applications, routines, components, programs, objects, modules, data structures, etc., which may be referred to herein as "software," "computer programs," or simply "programs."

The functionality outlined in the discussions herein regarding FIG. 2, FIG. 3A, FIG. 3B, FIG. 3C, FIG. 4A, and FIG. 4B above can be implemented using program instructions executed by a processing unit. These instructions could be implemented in hardware of the processing unit (e.g., using transistors), microcode which is attached to/part of the processing unit, or firmware of the processing unit. Implementing aspects of the disclosure using microcode or firmware of the processing unit is described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing cache coherence for a non-blocking memory cache in a computing system, the method comprising:
    setting a limit of snoop commands for the non-blocking memory cache to a numerical value;
    adjusting, using real-time bandwidth data of the computing system, the limit of snoop commands to a new numerical value;
    detecting the limit of snoop commands being adjusted more than a threshold number of times;
    in response to detecting the limit of snoop commands being adjusted more than the threshold number of times, designating a first overriding limit of snoop commands for the non-blocking memory cache, wherein the first overriding limit of snoop commands is fixed for a first period of time; and
    delaying, for the first period of time, snoop commands for the non-blocking memory cache which exceed the first overriding limit of snoop commands.

2. The method of claim 1, further comprising designating the first overriding limit of snoop commands for the non-blocking memory cache in response to detecting the limit of snoop commands being adjusted more than the threshold number of times within a first time threshold.

3. The method of claim 1, further comprising:
    detecting, within a second time threshold of the conclusion of the first period of time, the limit of snoop commands being adjusted more than the threshold number of times;
    identifying a change of cycles per instruction of the computing system between the inception of the first period of time and the conclusion of the first period of time;
    determining the change of cycles per instructions as satisfying a duration increase threshold; and
    in response to detecting, within the second time threshold, the limit of snoop commands being adjusted more than the threshold number of times, designating a second overriding limit of snoop commands which can be sent in the computing system, wherein the second overriding limit of snoop commands is fixed for a second period of time which is longer than the first period of time.

4. The method of claim 3, further comprising designating the second overriding limit of snoop commands in response to detecting, within the second time threshold, the limit of snoop commands being adjusted more than the threshold number of times between the numerical value and the new numerical value.

5. The method of claim 1, further comprising:
detecting, within a second time threshold of the conclusion of the first period of time, the limit of snoop commands being adjusted more than the threshold number of times;
identifying a change of cycles per instruction of the computing system between the inception of the first period of time and the conclusion of the first period of time;
determining the change of cycles per instructions as satisfying a duration decrease threshold; and
in response to detecting, within the second time threshold, the limit of snoop commands being adjusted more than the threshold number of times, designating a second overriding limit of snoop commands which can be sent in the computing system, wherein the second overriding limit of snoop commands is fixed for a second period of time which is shorter than the first period of time.

6. The method of claim 1, wherein the numerical value is one of a set of predetermined numerical values of limits of snoop commands which can be sent in the computing system.

7. The method of claim 6, wherein adjusting the limit of snoop commands to the new numerical value in response to real-time bandwidth of the computing system further comprises:
determining, using the real-time bandwidth of the computing system, a predetermined numerical value of the set of predetermined numerical values to adjust to;
determining that a delta between the numerical value and the predetermined numerical value exceeds a threshold; and
determining, in response to determining that the delta exceeds the threshold, a number between the numerical value and the predetermined numerical value for the new numerical value.

8. The method of claim 1, wherein the computing system is a homogenous multi-processor single image system.

9. The method of claim 1, further comprising adjusting, following the conclusion of the first period of time, the limit of snoop commands using real-time bandwidth data of the computing system.

* * * * *